United States Patent [19]

Okamoto et al.

[11] Patent Number: 4,920,812
[45] Date of Patent: May 1, 1990

[54] ENGINE STARTER STRUCTURE

[75] Inventors: Kyoichi Okamoto; Noriyuki Tanaka; Shigeru Shiroyama, all of Hyogo, Japan

[73] Assignee: Mitsubishi Denki Kabushiki Kaisha, Tokyo, Japan

[21] Appl. No.: 259,666

[22] Filed: Oct. 19, 1988

[30] Foreign Application Priority Data

Oct. 28, 1987 [JP] Japan ............... 62-165630[U]

[51] Int. Cl.$^5$ ............................. F02N 15/00
[52] U.S. Cl. ............................. 74/6; 29/525; 74/7 E; 475/331
[58] Field of Search .......... 74/6, 7 R, 7 E, 750 R; 29/159 R, 432, 525; 72/327

[56] References Cited

U.S. PATENT DOCUMENTS

| | | | |
|---|---|---|---|
| 1,268,350 | 6/1918 | Henry | 74/750 R |
| 2,464,890 | 3/1949 | Premo | 74/750 R |
| 3,667,324 | 6/1972 | Laing | 74/750 R |
| 4,519,261 | 5/1985 | Hamano | 74/7 E |

Primary Examiner—Leslie A. Braun
Assistant Examiner—Scott Anchell
Attorney, Agent, or Firm—Sughrue, Mion, Zinn, Macpeak & Seas

[57] ABSTRACT

In an engine starter having a planet reduction gear mechanism including a planet gear arm formed integrally on a driven shaft of the mechanism and having a plurality of holes and a corresponding number of roller pins pressure-inserted into the holes from one side surface of the planet gear arm and rotatably supporting planet gears, respectively, each hole is chamferred in the other side surface of the planet gear arm to receive a protrusion to be formed in the other side by the pressure-insertion of the roller pin.

1 Claim, 2 Drawing Sheets

ENGINE STARTER STRUCTURE

BACKGROUND OF THE INVENTION

The present invention relates to an engine starter having a planet reduction gear mechanism and, particularly, to a mounting structure of a planet gear arm and a roller pin of the reduction gear mechanism.

FIG. 3 is a cross section of a main portion of a conventional engine starter having planet reduction gear mechanism, in which a reference numeral 1 depicts an armature of a d.c. motor and 2 depicts a drive shaft which is integral with the armature 1 and has one end formed with a solar gear 2a of the planet reduction gear mechanism. A reference numeral 3 depicts an annular field magnetic pole of the d.c. motor, which is affixed to an inner peripheral surface of an annular yoke 4. An inner gear 6 is fitted to a bracket 5. Planet gears 7 each supported by a roller pin 8 implanted on a planet gear arm 9 formed integrally with a driven shaft 10 (FIG. 4) are arranged between the solar gear 2a and the inner gear 6. The planet gear arm 9 has holes 9a into which the roller pins 8 are pressure-inserted to complete the implantation. A packing 11 is provided between the bracket 5 and the inner gear 6 and a steel ball is provided between a front end of the drive shaft 2 and a rear end of the driven shaft 9.

In such starter having an output power rate of, for example, 0.7 to 2.2 KW, a thickness t of the planet gear arm 9, on which the roller pins are to be implanted, must be 4 to 8 mm, a diameter of the roller pin 8 must be 6 to 8 mm and a force for pulling-out the roller pin 8 from the planet gear arm 9 must be more than 200 Kg depending upon the size of the starter and the module of the gear to be used. Therefore, the size of the hole 9a of the planet gear arm 9 must be very precise. Further, since the roller pin 8 is inserted into the hole 9a from one side thereof under high pressure, a periphery of the hole 9a in the other side tends to be deformed as shown by a reference numeral 13 in FIG. 5. Such deformed portion 13 which may contact with a wall of the inner gear 6 has been removed by cutting away. Alternatively, a gap between the planet gear arm 9 and the inner gear 6 has been made large enough to avoid such contact. However, either of such solutions requires an increased number of manufacturing steps or an increase of size of the starter and thus it has been difficult to make the starter compact and light-weight.

SUMMARY OF THE INVENTION

An object of the present invention is to provide an engine starter having a planet reduction gear which is compact and light-weight and can be manufactured with a minimal number steps.

An engine starter according to the present invention includes a planet gear arm having a plurality of holes into each of which a roller pin is pressure-inserted from one side thereof. The other side of the hole is chamferred to provide a relief space for peripheral deformation thereof.

DETAILED DESCRIPTION OF THE PREFERRED EMBODIMENT

Figure 1A:
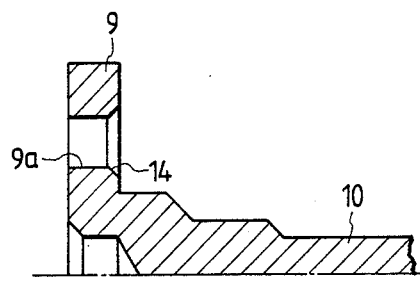
FIGS. 1a and 1b are a cross sectional view and a side view of an engine starter of planet reduction gear type according to an embodiment of the present invention.
Figure 1B:
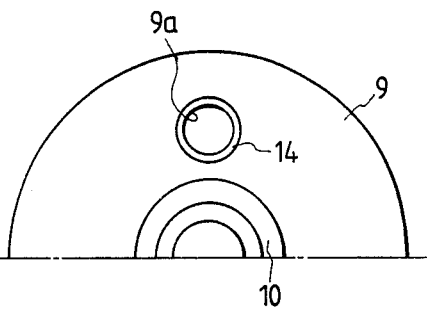
Figure 2:
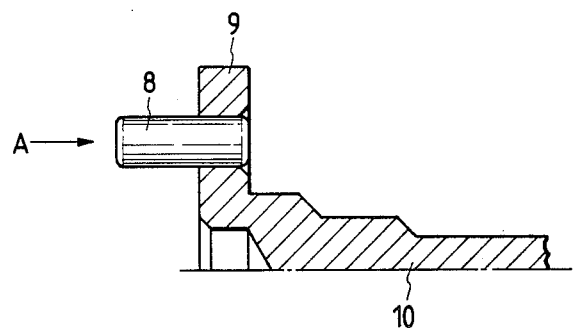
FIG. 2 is a cross section of a roller pin pressure-inserted into a planet gear arm of the starter in FIGS. 1a and 1b.
Figure 3:
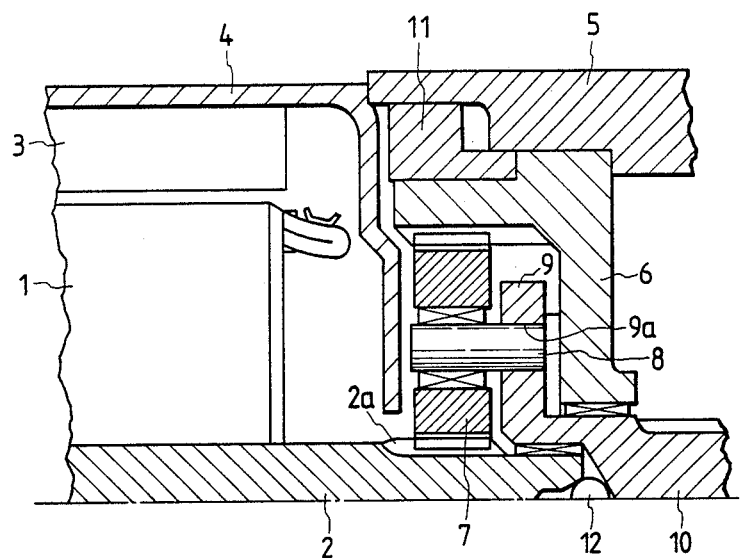
FIG. 3 is a cross section of a main portion of a conventional starter.
Figure 4:
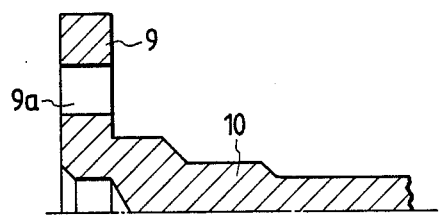
FIG. 4 is a cross-section of a planet gear arm of the conventional starter shown in FIG. 3.

FIGS. 1a and 1b show a planet gear arm of a planet reduction gear type engine starter according to an embodiment of the present invention and FIG. 2 shows a roller pin inserted into a hole of the planet gear arm. In these figures, reference numerals 8, 9, 9a and 10 depict the roller pin, the planet gear arm, the hole and a driven shaft, respectively, as in the conventional starter shown in FIG. 3. A reference numeral 14 depicts a chamfer provided in a periphery of the hole 9a in the side facing to an inner gear (not shown).

Figure 5:
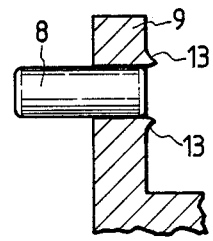
FIG. 5 shows a roller pin inserted into a planet gear arm of the conventional starter shown in FIG. 3.

The roller pin 8 is pressure-inserted into the hole 9a from the left side thereof in a direction shown by an arrow A as in the conventional case, as shown in FIG. 2. When there is no such chamfer as that shown by 14, such bulge as shown by 13 in FIG. 5 may be formed in the periphery of the hole 9a on the other side thereof. However, in the present invention, since such bulge is to be formed in the chamferred portion 14, it does not protrude from the other side surface of the gear arm 9. Therefore, there is no need of a subsequent machining to remove such protrusion.

As mentioned, according to the present invention which resides in the formation of a simple chamfer in an opposite side of a hole to a side thereof from which a roller pin is pressure-inserted, a protrusion to be formed by the pressure-insertion of the roller pin thereinto is received in the chamfer and does not protrude from the opposite side surface. Thus, the subsequent machining becomes unnecessary or there is no need of providing a large space between the opposite side surface of the planet gear arm and the inner gear.

What is claimed is:

1. An engine starter having a motor and a planet reduction gear mechanism comprising a planet gear arm formed with a driven shaft of said mechanism, said planet gear arm having a plurality of holes and a corresponding number of roller pins pressure-inserted into said holes of said planet gear arm from one side surface of said planet gear arm; and rotatably supported planet gears mounted on each of said roller pins, wherein each of said holes are chamfered in the other side surface of said planet gear arm to provide a chamfered portion such that when said roller pins are press-fitted into said holes from said one side, a resulting deformation of said gear arm proximate said holes is formed in said chamfered portion and does not protrude beyond said other side surface.

* * * * *